United States Patent
Sypitkowski et al.

(10) Patent No.: US 11,184,531 B2
(45) Date of Patent: Nov. 23, 2021

(54) DYNAMIC IMAGE BLENDING FOR MULTIPLE-CAMERA VEHICLE SYSTEMS

(71) Applicant: Robert Bosch GmbH, Stuttgart (DE)

(72) Inventors: Greg Sypitkowski, Farmington Hills, MI (US); Patrick Graf, Southfield, MI (US); James Stephen Miller, Dexter, MI (US)

(73) Assignee: Robert Bosch GmbH, Stuttgart (DE)

( * ) Notice: Subject to any disclaimer, the term of this patent is extended or adjusted under 35 U.S.C. 154(b) by 16 days.

(21) Appl. No.: 16/325,171

(22) PCT Filed: Oct. 12, 2016

(86) PCT No.: PCT/EP2016/074401
§ 371 (c)(1),
(2) Date: Feb. 12, 2019

(87) PCT Pub. No.: WO2017/108221
PCT Pub. Date: Jun. 29, 2017

(65) Prior Publication Data
US 2019/0230282 A1   Jul. 25, 2019

Related U.S. Application Data

(60) Provisional application No. 62/270,445, filed on Dec. 21, 2015.

(51) Int. Cl.
*H04N 5/00* (2011.01)
*B60R 1/00* (2006.01)
(Continued)

(52) U.S. Cl.
CPC ........... *H04N 5/23238* (2013.01); *B60R 1/00* (2013.01); *G06T 3/4038* (2013.01); *G06T 5/005* (2013.01);
(Continued)

(58) Field of Classification Search
CPC ...... H04N 5/23238; B60R 1/00; G06T 3/4038
(Continued)

(56) References Cited

U.S. PATENT DOCUMENTS 6,429,789 B1 * 8/2002 Kiridena ................ B60R 1/00
340/905
7,688,229 B2   3/2010 Sula et al.
(Continued)

FOREIGN PATENT DOCUMENTS

| GN | 102045546 A | 5/2011 |
| GN | 102577372 A | 7/2012 |
| JP | 2009134719 A | 6/2009 |

OTHER PUBLICATIONS

International Search Report for Application No. PCT/EP2016/074401 dated Dec. 16, 2016 (3 pages).
(Continued)

*Primary Examiner* — Jeffery A Williams
(74) *Attorney, Agent, or Firm* — Michael Best & Friedrich LLP

(57) ABSTRACT

A method and system for generating a composite video for display in a vehicle. A plurality of video streams are generated from a plurality of video cameras configured to be positioned on the vehicle. The video streams are transformed by an electronic processor to create a virtual camera viewpoint. The transformed video streams are combined to generate a composite video including a portion of a first image that is generated from a first one of the video cameras. The electronic processor detects an object external to the vehicle and determines whether the object at least partially obscures the portion of the first image. When the object at least partially obscures the portion of the first image, the electronic processor supplements the portion of the first
(Continued)

image with a portion of a second image that is generated by a second one of the video cameras.

16 Claims, 6 Drawing Sheets

(51) Int. Cl.
  *G06T 3/40* (2006.01)
  *H04N 5/232* (2006.01)
  *G06T 5/00* (2006.01)
  *G06T 11/00* (2006.01)
  *G06T 5/50* (2006.01)
  *H04N 5/262* (2006.01)
  *H04N 5/272* (2006.01)

(52) U.S. Cl.
  CPC .............. *G06T 5/50* (2013.01); *G06T 11/001* (2013.01); *H04N 5/2628* (2013.01); *H04N 5/272* (2013.01); *B60R 2300/105* (2013.01); *B60R 2300/303* (2013.01); *G06T 2207/10016* (2013.01); *G06T 2207/30261* (2013.01)

(58) Field of Classification Search
  USPC .......................................................... 348/38
  See application file for complete search history.

(56) References Cited

U.S. PATENT DOCUMENTS

| | | | |
|---|---|---|---|
| 7,859,565 B2 | 12/2010 | Schofield et al. | |
| 8,086,071 B2 | 12/2011 | Chen et al. | |
| 8,130,270 B2 | 3/2012 | Ito et al. | |
| 8,160,391 B1 | 4/2012 | Zhu et al. | |
| 8,576,285 B2 | 11/2013 | Gomi et al. | |
| 8,633,970 B1 | 1/2014 | Mercay et al. | |
| 8,908,035 B2 | 12/2014 | Russ et al. | |
| 2008/0266142 A1* | 10/2008 | Sula .................... | G01C 21/3647 340/995.17 |
| 2009/0086015 A1 | 4/2009 | Larsen et al. | |
| 2009/0110239 A1* | 4/2009 | Chen .................... | G06T 11/001 382/103 |
| 2009/0195652 A1 | 8/2009 | Gal | |
| 2009/0273674 A1 | 11/2009 | Russ et al. | |
| 2010/0141736 A1* | 6/2010 | Hack .................... | G01C 11/00 348/36 |
| 2010/0259372 A1 | 10/2010 | Hideshiro | |
| 2011/0228078 A1 | 9/2011 | Chen et al. | |
| 2013/0250046 A1 | 9/2013 | Schofield et al. | |
| 2013/0293717 A1 | 11/2013 | Zhang et al. | |
| 2014/0139676 A1 | 5/2014 | Wierich | |
| 2014/0247352 A1 | 9/2014 | Rathi et al. | |
| 2014/0333729 A1 | 11/2014 | Pflug | |
| 2014/0354686 A1 | 12/2014 | Mullins | |
| 2015/0042678 A1 | 2/2015 | Alt et al. | |
| 2015/0331236 A1 | 11/2015 | Roth et al. | |
| 2016/0065944 A1* | 3/2016 | Fujii .................... | H04N 13/243 348/47 |
| 2017/0120817 A1* | 5/2017 | Kuehnle ................ | B60R 1/00 |

OTHER PUBLICATIONS

Notice of Preliminary Rejection from the Korean Intellectual Property Office for Application No. 10-2018-7017408 dated Jul. 18, 2019 (9 pages).

Hughes, C., et al., "Wide-angle camera technology for automotive applications, a review.", IET. Intelligent Transport Systems, vol. 3.1, (2009).

English translation of Chinese Patent Office Action for Application No. 201680074727.1 dated Jan. 15, 2021 (13 pages).

* cited by examiner

FIG. 1 - PRIOR ART

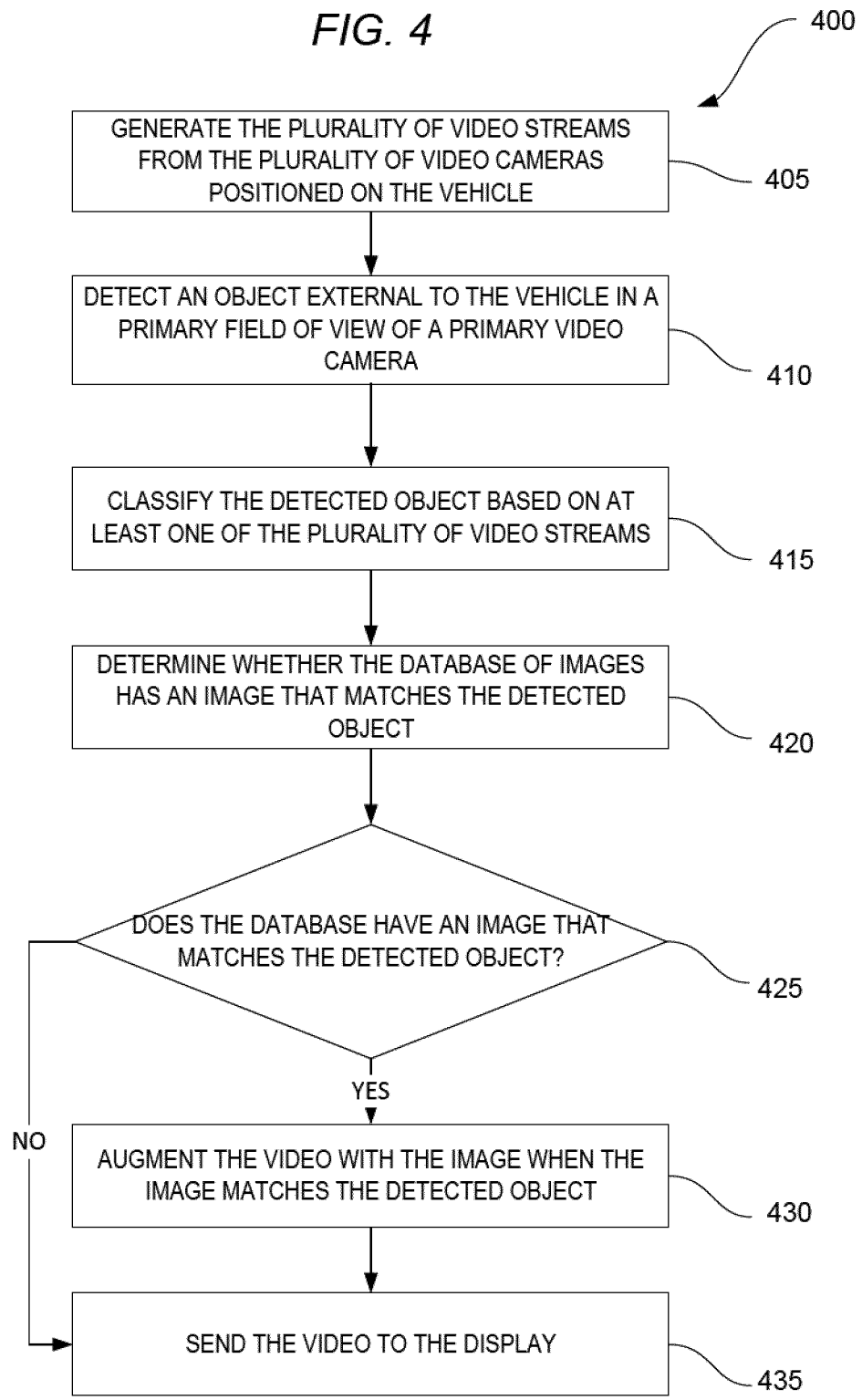

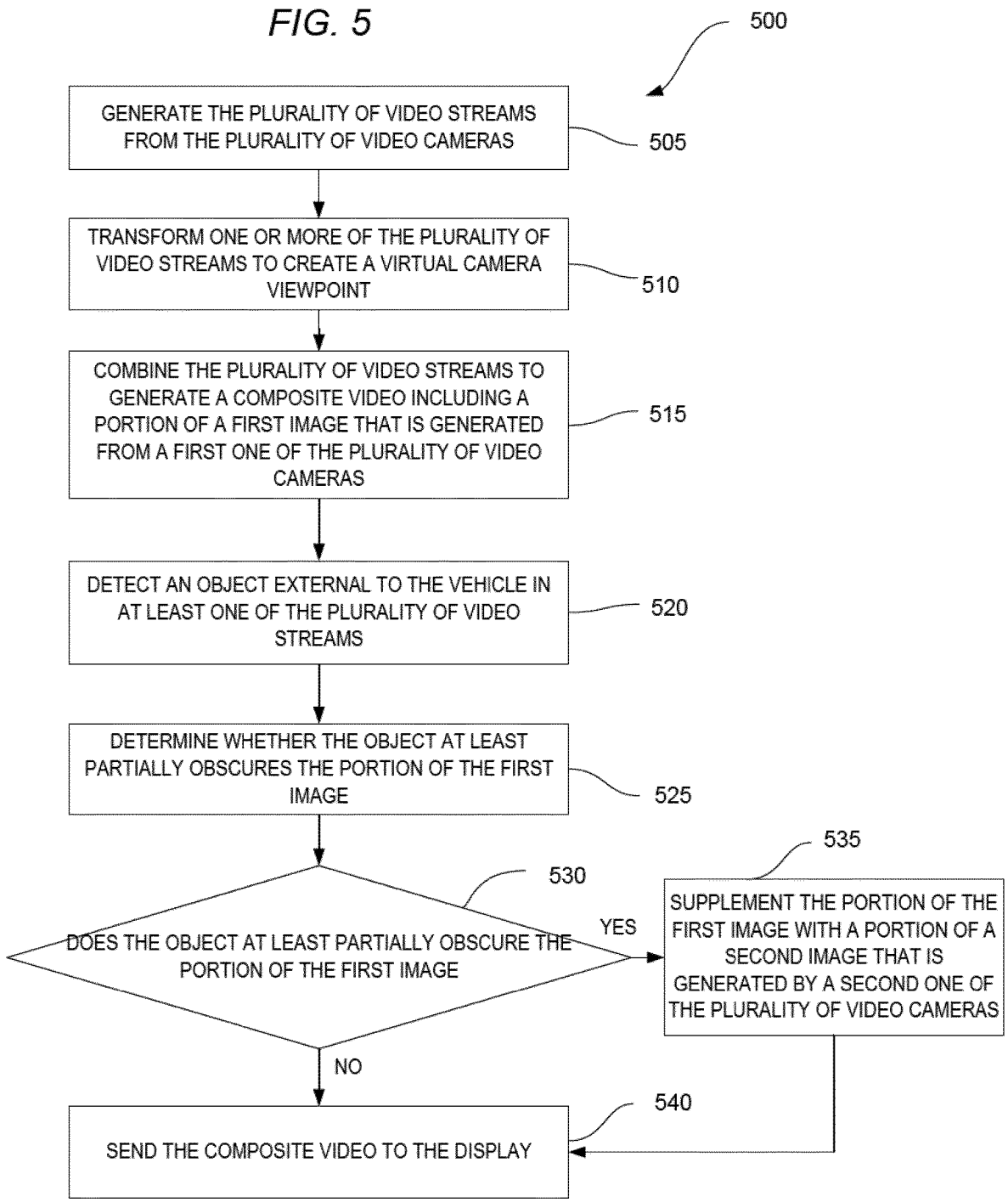

DYNAMIC IMAGE BLENDING FOR MULTIPLE-CAMERA VEHICLE SYSTEMS

RELATED APPLICATIONS

The present application claims priority to U.S. Provisional Application No. 62/270,445 filed on Dec. 21, 2015, the entire contents of which are incorporated herein by reference.

BACKGROUND

Traditionally, vehicle imaging systems include one or more video cameras positioned on an exterior of a vehicle. The video cameras monitor an area surrounding the vehicle for objects and hazards. Some vehicle imaging systems provide a display on or near the dashboard for viewing by a driver. As a consequence, perception by a driver of the area surrounding the vehicle is enhanced. In some constructions, the vehicle imaging systems may combine multiple camera video streams into a composite video for viewing by the driver. The multiple camera video streams are processed by video processing equipment to provide multiple different views including wide-angle views, top-down views, and the like.

In one known system illustrated in FIG. 1, camera feeds from four wide-angle (e.g., omnidirectional) cameras spaced on different sides of a vehicle 100 are combined into a composite video that provides a virtual top-down view of the vehicle 100. In such a system, the top-down video displays the vehicle 100 and surrounding objects as illustrated in FIG. 1. However, since the virtual top-down view is generated from multiple omnidirectional cameras, the composite video contains distorted objects 105 with stretched dimensions, cropped edges, flattened surfaces, and the like. In addition, blind spots 115 in the top-down video may occur due to blocking objects 120 that block a field of view 125 of a video camera 130.

SUMMARY

Embodiments provide systems and methods that enhance images displayed to a driver of the vehicle for improved clarity and field of view. The systems and methods augment distorted objects to provide improved views of the vehicle and surrounding area. The systems and methods also dynamically blend multiple video streams to reduce blind spots caused from objects in the image.

One embodiment provides a method of generating a composite video for display in a vehicle. The method includes generating a plurality of video streams from a plurality of video cameras configured to be positioned on the vehicle. The one or more of the plurality of video streams are transformed by an electronic processor to create a virtual camera viewpoint. The plurality of transformed video streams are combined to generate a composite video including a portion of a first image that is generated from a first one of the plurality of video cameras. The electronic processor detects an object external to the vehicle and determines whether the object at least partially obscures the portion of the first image. When the object at least partially obscures the portion of the first image, the electronic processor supplements the portion of the first image with a portion of a second image that is generated by a second one of the plurality of video cameras.

Another embodiment provides a system for generating a composite video to display in a vehicle. The system includes a plurality of video cameras that generate a plurality of video streams and that are configured to be positioned on the vehicle. The system also includes a display and an electronic processor communicatively coupled to the plurality of video cameras and the display. The electronic processor is configured to transform the plurality of video streams to create a virtual camera viewpoint. The electronic processor combines the plurality of transformed video streams to generate a composite video including a portion of a first image that is generated from a first one of the plurality of video cameras. The electronic processor detects an object external to the vehicle and determines whether the object at least partially obscures the portion of the first image. When the object at least partially obscures the portion of the first image, the electronic processor supplements the portion of the first image with a portion of a second image that is generated by a second one of the plurality of video cameras.

Other aspects of the invention will become apparent by consideration of the detailed description and accompanying drawings.

BRIEF DESCRIPTION OF THE DRAWINGS

FIG. 4 is a flowchart of a method of augmenting a video with the dynamic image blending and augmentation system of FIG. 2.

FIG. 5 is a flowchart of a method of dynamically blending a video with the dynamic image blending and augmentation system of FIG. 2.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

A plurality of hardware and software based devices, as well as a plurality of different structural components may be used to implement embodiments of the invention. In addition, embodiments may include hardware, software, and electronic components or modules that, for purposes of discussion, may be illustrated and described as if the majority of the components were implemented solely in hardware. However, one of ordinary skill in the art, based on a reading of this detailed description, would recognize that, in at least one embodiment, aspects of the invention may be implemented in software (e.g., stored on non-transitory computer-readable medium) executable by one or more processors. Accordingly, it should be noted that a plurality of hardware and software based devices, as well as a plurality of different structural components may be utilized to implement various embodiments. For example, "control units" and "controllers" described in the specification can include one or more electronic processors, one or more memory modules including non-transitory computer-readable medium, one or more input/output interfaces, and various connections (e.g., a system bus) connecting the components.

Figure 1:
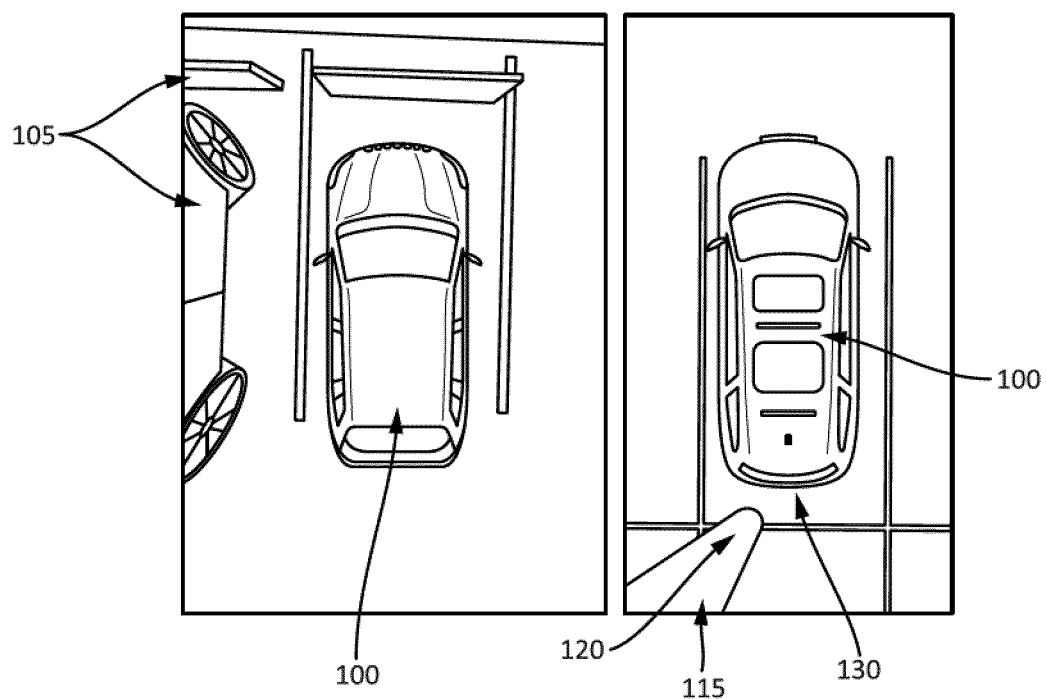
FIG. 1 is a top-down perspective view of a vehicle and surrounding area as displayed on a vehicle display.
Figure 2:
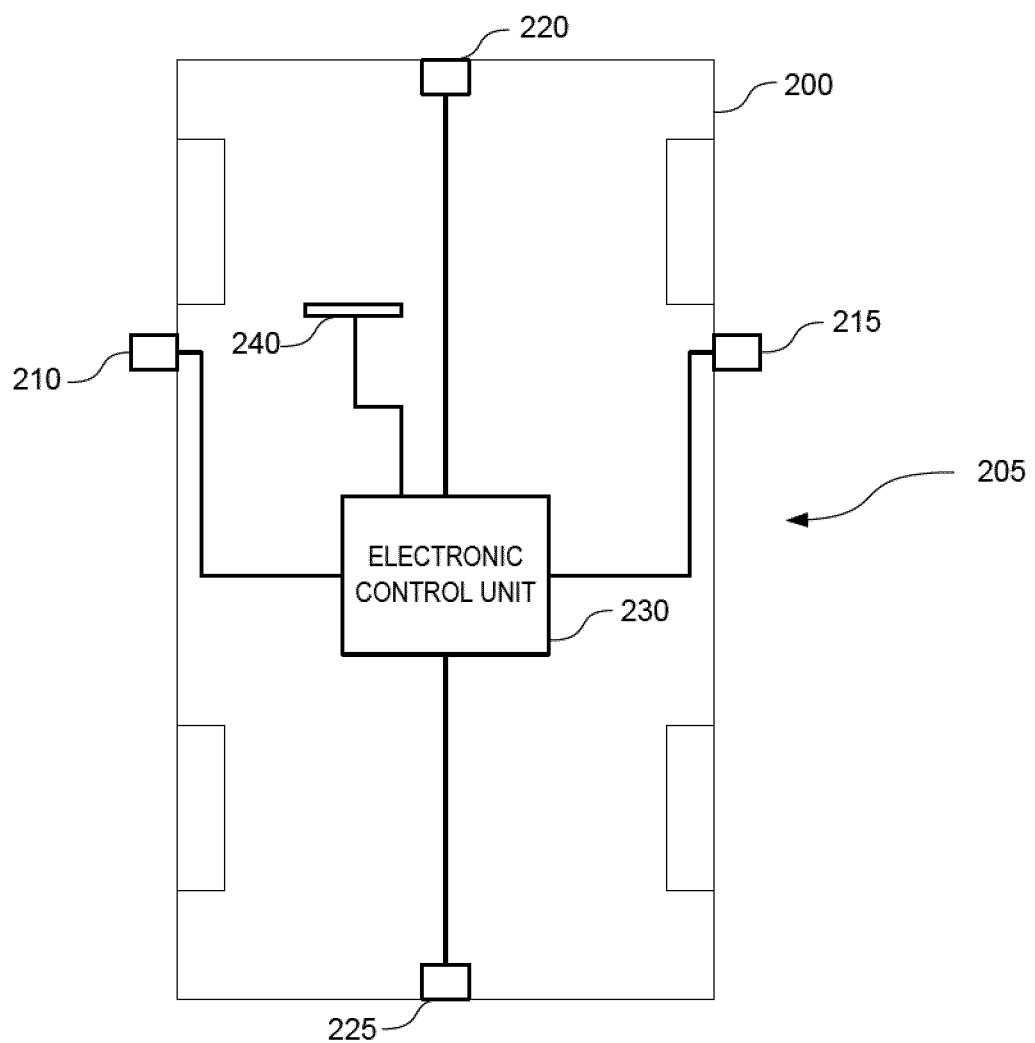
FIG. 2 is a block diagram of a vehicle equipped with a dynamic image blending and augmentation system according to one embodiment.

FIG. 2 illustrates a vehicle 200 equipped with an dynamic image blending and augmentation system 205 according to one embodiment. The vehicle 200 includes a driver-side camera 210 (e.g., attached to or located near to a driver-side mirror), a passenger-side camera 215 (e.g., attached to or located near to a passenger-side mirror), a front camera 220, and a rear camera 225. The vehicle 200 also includes an electronic control unit (ECU) 230 and a vehicle display 240. Each of the components of the dynamic image blending and augmentation system 205 may be communicatively coupled. For example, the electronic control unit 230 is coupled to the vehicle display 240, the driver-side camera 210, the passenger-side camera 215, the front camera 220, and the rear camera 225 via a wired or wireless connection.

Figure 3:
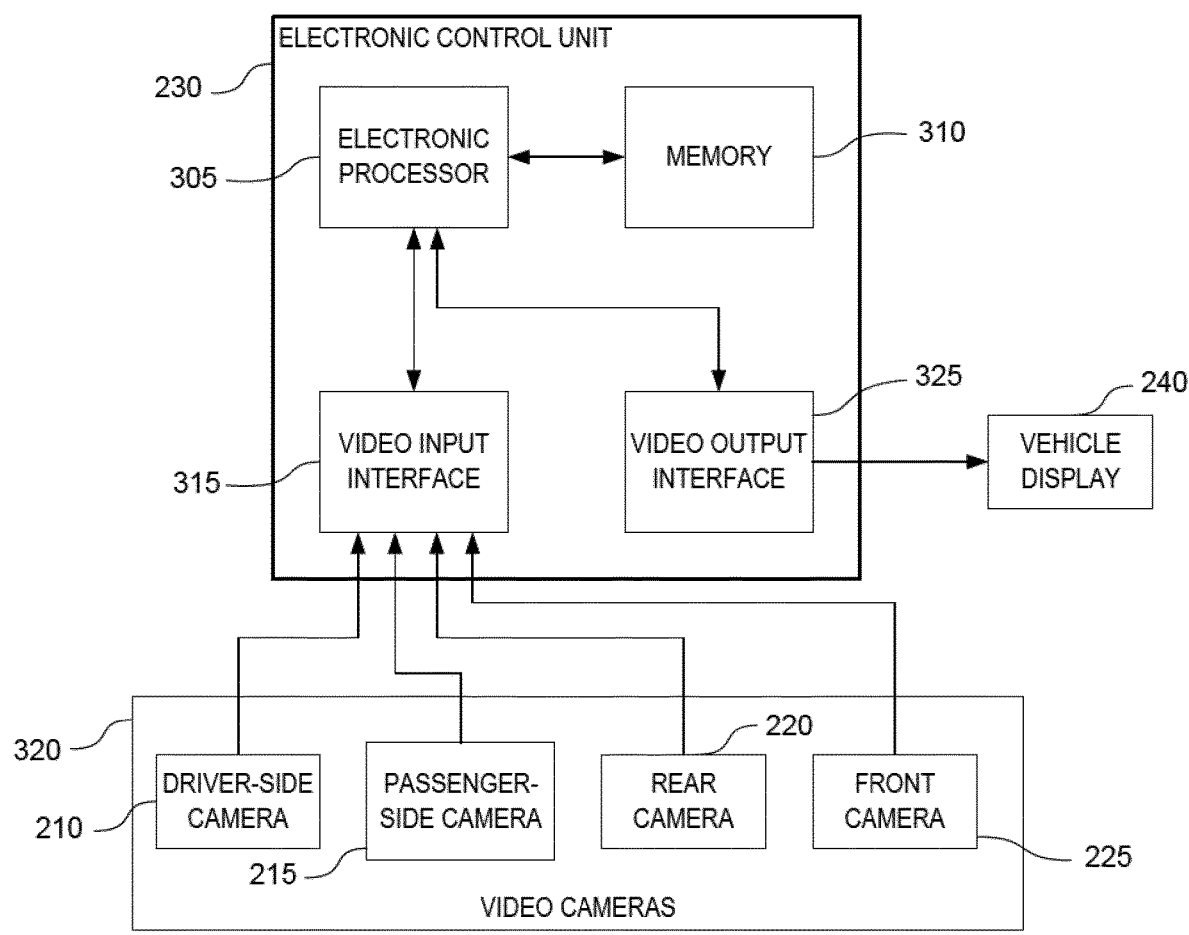
FIG. 3 is a block diagram of an electronic control unit and associated connections of the vehicle of FIG. 2 in accordance with one embodiment.

An example configuration of the dynamic image blending and augmentation system 205 is illustrated in FIG. 3. In this example, the electronic control unit 230 includes a plurality of electrical and electronic components that provide power, operation control, and protection to the components and modules within the electronic control unit 230. The electronic control unit 230 includes, among other things, an electronic processor 305 (such as a programmable electronic microprocessor, microcontroller, or similar device), a memory 310 (e.g., non-transitory, machine readable memory), a video input interface 315, and a video output interface 325. The electronic processor 305 is communicatively coupled to the memory 310 and executes instructions which are capable of being stored on the memory 310. The electronic processor 305 is configured to retrieve from memory 310 and execute, among other things, instructions related to processes and methods described herein. In other embodiments, the electronic control unit 230 includes additional, fewer, or different components. For example, the electronic control unit 230 may be implemented in several independent electronic control units each configured to perform specific functions or sub-functions. Additionally, the electronic control unit 230 may contain sub-modules that input and process video data (e.g., video streams) and perform related processes. For example, a video analysis module located within or communicatively coupled to the electronic control unit 230 may input one or more video streams, detect objects and features in the image, track objects and features within the image, classify objects and features in the image, and send data outputs from these processes to other electronic control units or modules of the vehicle 200.

As illustrated, the driver-side camera 210, the passenger-side camera 215, the front camera 220, and the rear camera 225 are collectively illustrated and described as video cameras 320. The video cameras 320 are communicatively coupled to the video input interface 315. The video input interface 315 receives and processes multiple video streams from the video cameras 320. The video input interface 315, in coordination with the electronic processor 305 and memory 310, transforms and combines the multiple video streams into a composite video. The video output interface 325, in conjunction with the electronic processor 305 and memory 310, generates and sends the composite video to the vehicle display 240 for viewing by a driver. For example, the vehicle display 240 may be positioned on a dashboard, on a center console, or other locations visible to the driver. The vehicle display 240 may include various types of displays including liquid crystal displays (LCDs), light emitting diodes (LEDs), touchscreens, and the like.

The electronic control unit 230, the video input interface 315, the video output interface 325, and the vehicle display 240 may be communicatively linked through a direct wired or wireless connection. In other embodiments, these components may be communicatively linked by a vehicle communication bus 115 and communication modules.

In some embodiments, each of the video cameras 320 has approximately a 180 degree field of view. In some embodiments, the combination of video cameras 320 provides a field of view that reach 360 degrees around the vehicle 200. The video cameras 320 may be omnidirectional cameras (e.g., fisheye lens cameras) with a wide-angle field of view. The electronic processor 305 combines each of the plurality of video streams such that edges of each of the plurality of video streams overlap, for example, in a process where images from the video streams are stitched together. In this way, the edges of images of each of the plurality of video streams overlaps with the edges of images from adjacent cameras. Once the electronic processor 305 receives the plurality of video streams, the electronic processor 305 transforms one or more of the plurality of video streams to create a virtual camera viewpoint. The transformation may include transforming images from each of the plurality of video streams into rectilinear images before or after stitching the images from the video cameras 22. For example, the electronic processor 305 may create a composite video with rectilinear images from a perspective above, and looking down at, the vehicle 100.

For example, the driver-side camera 210 may have a field of view that overlaps with a field of view of the rear camera 225. In the overlapping region, either the driver-side camera 210 or the rear camera 225 may supply a portion of the video output of the overlapping region. For example, in the overlapping region, an object may be visible by both the front camera 220 and the passenger-side camera 215. In one particular example, if the object is at less of an angle from, the front camera 220 than the passenger-side camera 215, the electronic processor 305 designates the front camera 220 as providing the portion of the composite video that contains the object. However, as described below, the electronic processor 305 supplements the composite video with a portion of an image from, in this example, the passenger-side camera 215 to generate a blocked region behind the detected object.

In general, omnidirectional cameras provide video streams with higher resolution and less distortion in the center of the image and lower resolutions and higher distortion at the edges of the image. As a consequence, the electronic processor 305 generates the composite video based on, at least in part, the location of the object within the plurality of video streams. For example, each of the video cameras 320 provide images of portions of an area surrounding the vehicle 200. By combining these portions, the electronic processor 305 forms the composite video. When combining the plurality of video streams, the electronic processor 305 may align the video streams, adjust viewing angles, crop the image, and orientate the video stream to display the composite video as a continuous and integrated top-down field of view.

However, in some instances, the images of portions of the area surrounding the vehicle 200 as well as objects surrounding the vehicle 200 may be distorted or obscured in that portion of the composite video. In one example, when an object is generated in the composite video, the object may be distorted due to the wide angle view of the primary camera. In this case, the electronic processor 305 augments the composite video to clarify portions of the area surrounding the vehicle 200 based on detected objects as described in detail below. In another example, when an object is located near to the vehicle 200, the object may obstruct a region of the primary field of view of the primary video camera on the side opposite of the object. In such a case, the electronic processor 305 dynamically blends the blocked portion of the field of view with the video stream from another of the video cameras 320 as also described in more detail below. In this way, the primary field of view is supplemented with the secondary field of view from a secondary camera. In some embodiments, the electronic processor 305 supplements the composite video by overlaying images from the secondary camera on images from the primary video camera. For example, the electronic processor 305 may replace pixels representing the detected object in the video stream from the primary video camera with pixels representing at area around the detected object from the secondary video camera that best matches the virtual camera viewpoint. In some embodiments, when not dynamically blending the image, the portion of the image with the overlapping region is provided solely by the primary video camera.

FIG. 4 illustrates an augmentation method 400 according to one embodiment. In the augmentation method 400, the plurality of video cameras 320 generates the plurality of video streams and sends the plurality of video streams to the electronic processor 305 (block 405). The electronic processor 305 detects an object external to the vehicle in at least one of the plurality of video streams (block 410). In some embodiments, the electronic processor 305 determines which of the plurality of video streams includes the detected object and may analyze the object based on a single video stream or on multiple video streams. In addition, the electronic processor 305 may detect multiple objects in the plurality of video streams and process each object independently and simultaneously.

In some embodiments, once the object is detected, the electronic processor 305 obtains features and parameters that define the object from multiple sources. For example, image data from the plurality of video streams may be used to generate features of the object, and other sensors on the vehicle 200 may help define the parameters of the detected object such as size, dimensions, position, color, shape, texture, and the like. The other sensors may include radar sensors, ultrasonic sensors, light detection and ranging sensors (LIDAR), and the like. The electronic processor 305 classifies the detected object using predetermined classifications based on at least one of the plurality of video streams, and in some embodiments, on the features, parameters, or both of the detected object (block 415). In some embodiments, the electronic processor 305 determines whether the detected object is distorted in the image, and the electronic processor 305 only augments the video stream when the detected object is distorted.

Classifying the detected object may include comparing the detected object in the at least one video stream to a database of predetermined images of objects in the memory 310 and determining whether the database of predetermined images has an image that matches the detected object (block 420). For example, in some embodiments, the electronic processor 305 may classify the object or refine the classification of the object by comparisons of the parameters of the detected object to a plurality of known objects in a look-up table. In this way, the electronic processor 305 selects one of the plurality of known objects to associate with the detected object when the detected object matches the one of the plurality of known objects. This may include comparing the parameters of the detected object to ranges of parameters that define known objects. When the object matches an image in the database (block 425), the electronic processor 305 determines that the object is subject to augmentation based on the classification. When the object does not match an image in the database, and therefore is not subject to augmentation (block 425), the object is displayed within the composite video on the vehicle display 240 without being augmented. Conversely, when the object is subject to augmentation, the electronic processor 305 augments the composite video with the image from the database (block 430). Then, the electronic processor 305 sends the composite video to the vehicle display 240 for viewing (block 435).

Once the detected object is classified as subject to augmentation, the electronic processor 305 generates a matching image. The matching image may be based on features of the detected object within the video stream. In some embodiments, the electronic processor 305 determines a best match of the detected object with the database of predetermined images. For example, when the detected object is classified as a vehicle, the electronic processor 305 searches the database of images including images of vehicles and finds a matching image (e.g., a best match) based on the features obtained from the video stream. Also, in some embodiments, the electronic processor 305 searches the database of images based on the features obtained from the video stream and parameters obtained from the other vehicle sensors. Once the matching image is found, the electronic processor 305 adjusts the matching image based on the features and/or parameters of the detected object. For example, the electronic processor 305 may adjust the matching image based on the size, dimensions, color, etc. of the detected object. The electronic processor 305 then overlays the matching image over the detected object, and thus forms an augmented object in the composite video. As such, the matching image covers the detected object and effectively replaces the detected image with the matching image in the composite video. Then, the electronic processor 305 sends the composite video with the augmented object to the vehicle display 240.

FIG. 5 illustrates a dynamic blending method 500 according to one embodiment. In the dynamic blending method 500, the plurality of video streams are generated from the plurality of video cameras 22 (block 505). The electronic processor 305 transforms the one or more of the plurality of video streams to create a virtual camera viewpoint (block 510). The electronic processor 305 combines the plurality of video streams to generate a composite video including a portion of a first image that is generated from a first one of the plurality of video cameras 22 (block 515). The electronic processor 305 detects an object external to the vehicle 200 in at least one of the plurality of video streams (block 520). In some situations, the detected object may be visible by multiple cameras. In these situations, the electronic processor 305 may determine which one of the plurality of video streams has a primary field of view of the detected object. In particular, the primary field of view describes a field of view of a camera with a better view (for example, a view with less of a viewing angle, a closer view, a higher resolution view, a lower distortion view, etc.) of the detected object than the other cameras. Similarly, a secondary field of view describes a field of view of a camera with a field of view that is not as good (for example, a longer view, a view with a greater viewing angle, a lower resolution view, a higher distortion view, etc.) of the detected object. As a consequence, the particular camera with the primary field of view of the region typically generates an image of better quality than the camera with the secondary field of view. However, some of the region may not be visible in the primary field of view of the primary camera.

In the dynamic blending method 500, the electronic processor 305 determines whether the object at least partially obscures the portion of the first image (block 525). In some embodiments, determining whether the object partially obscures the portion of the first image includes determining that a region of the primary field of view is blocked by the detected object. The electronic processor 305 may also determine whether the secondary field of view captures a blocked region of the primary field of view. When the secondary field of view captures the blocked region of the primary field of view, the electronic processor 305 determines that the composite video should be dynamically blended. When the object as least partially obscures the portion of the first image (block 525), the electronic processor 305 supplements the portion of the first image (e.g., from the primary field of view) with a portion of a second image that is generated by a second one of the plurality of video cameras 22 (e.g., the secondary field of view of the secondary video camera) (block 535). In particular, the electronic processor 305 may blend the primary field of view of the blocked region with the secondary field of view of the blocked region by overlaying the secondary field of view of the blocked region onto the primary field of view of the blocked region to generate the composite video. When the secondary field of view does not reach the blocked region, the electronic processor 305 may not dynamically blend the image. In either case, in the next step, the electronic processor 305 sends the composite video to the vehicle display 240 (block 540).

Figure 6A:
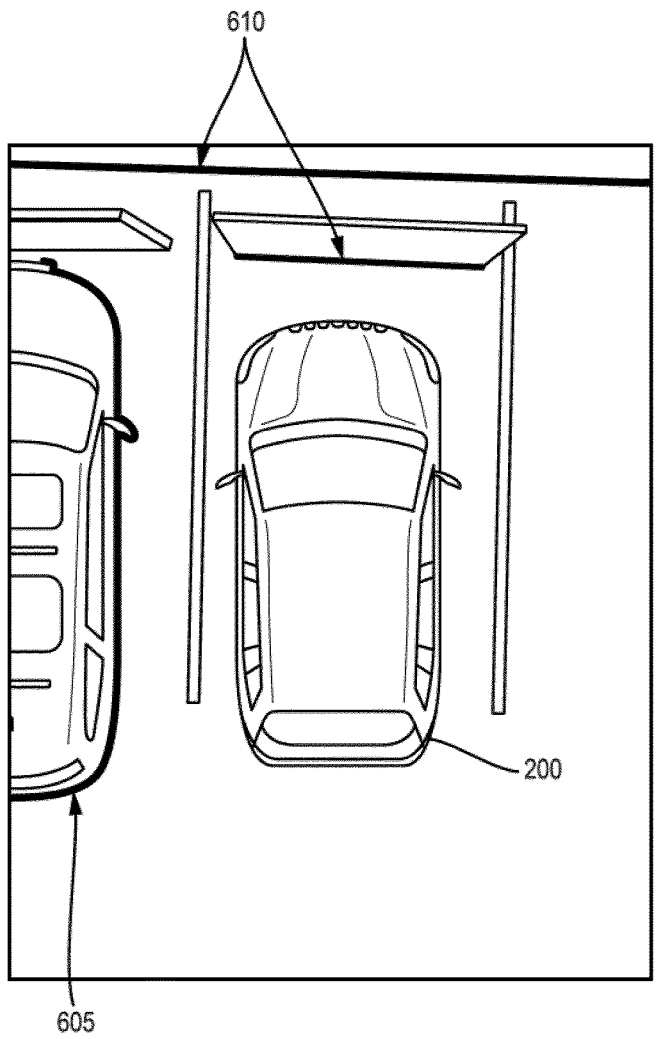
FIGS. 6A and 6B are top-down perspective views of the vehicle and surrounding area as displayed on the vehicle display after enhancing the video with the dynamic image blending and augmentation system of FIG. 2.
Figure 6B:
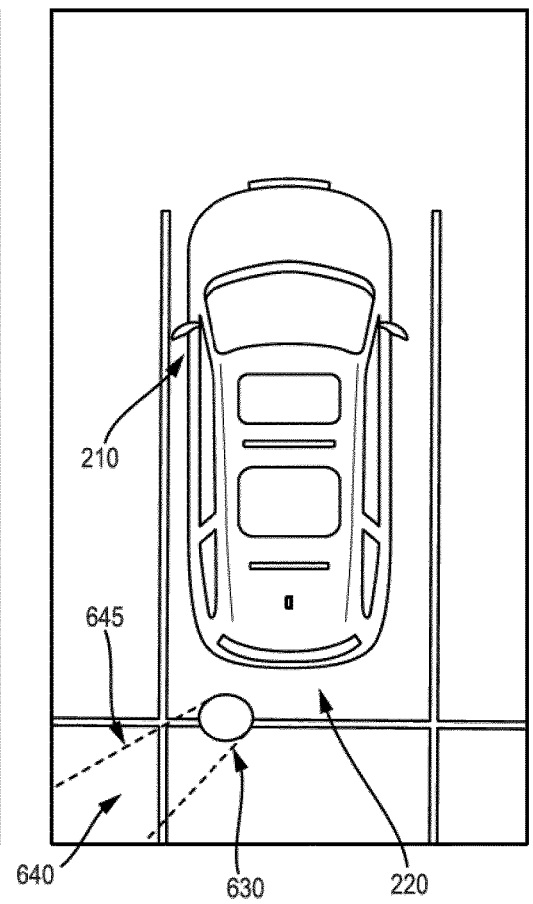

FIGS. 6A and 6B illustrate examples of the composite video displayed on the vehicle display 240 after performing the methods of FIGS. 4 and 5. In particular, FIG. 6A illustrates a virtual top-down view of the vehicle 200 including augmented objects generated by the electronic processor 305. FIG. 6B illustrates the virtual top-down view of the vehicle 200 including an image that is dynamically blended by the electronic processor 305. As described above, this virtual top-down view is formed based on the video streams from the video cameras 22 and the video processing that occurs within the electronic processor 305.

In the illustrated example of FIG. 6A, the electronic processor 305 detects an object 605 (for example, an adjacent vehicle) and a plurality of objects 610 (for example, curbs). The object 605 is detected by the driver-side camera 210, which also provides the primary field of view. The object 605 may also be detected by the front camera 220 and the rear camera 225, which provide secondary fields of view of the object 605. According to the method of FIG. 4, the electronic processor 305 detects the object 605, classifies the object 605 as a vehicle, determines that the object 605 is within the first predetermined classification, and augments the composite video based on the object 605. In this case, the electronic processor 305 matches the object 605 to a top-down image of a particular vehicle including, in some embodiments, a particular make and model of the vehicle. The electronic processor 305 may also determine the color of the vehicle based on the primary field of view or on parameters gathered from other sensors in the vehicle 200. The electronic processor 305 then overlays the image of the particular vehicle with the appropriate color onto the object 605 and displays the composite video on the vehicle display 240.

Similarly, the electronic processor 305 detects the objects 610 with at least the front camera 220, classifies the objects 610 as curbs, determines that the objects 610 are able to be augmented based on the classification (i.e., that there are matching images in the database), and augments the composite video based on the objects 610. In this case, the electronic processor 305 may determine the features and parameters of the objects 610 such as the heights, lengths, thicknesses, etc. in order to classify the objects 610. The electronic processor 305 may also augment the composite video with images based on the video stream from the front camera 220 and from other sensors. For example, the electronic processor 305 may adjust images of curbs within the database to correspond to the features and parameters and then overlay the adjusted images onto the objects 610 in the composite video.

FIG. 6B illustrates an example of the composite video after performing the dynamic blending method 500. The composite video includes an object 630 (e.g., a light pole) that blocks a portion of the field of view (i.e., a blocked region 640) of the rear camera 225. The blocked region 640 of the field of view is visible by the driver-side camera 210. According to the dynamic blending method 500, the blocked region 640 as captured in the video stream of the driver-side camera 210 is blended into the video stream from the rear camera 225. As discussed above, the portion of the video stream from the secondary camera is overlaid onto the portion of the video stream containing the blocked region from the primary camera. In this example, the blocked region 640 of the video stream from the rear camera 225 is overlaid with the portion of the video stream from the driver-side camera 210. Once the portion is overlaid, the electronic processor 305 sends the composite video with the blocked region 640 visible to the vehicle display 240. Thus, the blocked region 640 is visible in the vehicle display 240.

Thus, embodiments provide, among other things, a system and a method for augmenting and dynamically blending one or more video streams from one or more video cameras positioned on a vehicle to generate a composite video for a vehicle display. Various features and advantages of the invention are set forth in the following claims.

What is claimed is:

1. A method of generating a composite video for display in a vehicle, the method comprising:
   generating a plurality of video streams from a plurality of video cameras configured to be positioned on the vehicle;
   transforming one or more of the plurality of video streams to create a virtual camera viewpoint;
   combining the plurality of transformed video streams to generate a composite video including a portion of a first image that is generated from a first one of the plurality of video cameras;
   detecting, with an electronic processor, an object external to the vehicle;
   determining whether the object at least partially obscures the portion of the first image;
   supplementing the portion of the first image with a portion of a second image that is generated by a second one of the plurality of video cameras when the object at least partially obscures the portion of the first image to create a supplemented composite video, wherein the supplemented composite video supplemented composite video includes a top-down field of view of the portion of the first image supplemented with the portion of the second image;
   classifying the object with the electronic processor;

generating a matching image based on the classification of the object;

overlaying the matching image on the detected object in the composite video as an augmented object, wherein the augmented object is the visual representation of the object;

receiving a feature of the object from at least one sensor;

determining, with the electronic processor, that the object is distorted in the supplemented composite video; and in response to determining that the object is distorted, adjusting the matching image based on the feature before overlaying the matching image on the object in the composite video as an augmented object.

2. The method of claim 1, wherein generating the plurality of video streams from the plurality of video cameras includes generating a plurality of wide-angle images with the plurality of video cameras.

3. The method of claim 2, wherein transforming the one or more of the plurality of video streams includes transforming the plurality of wide-angle images to a plurality of rectilinear images.

4. The method of claim 1, wherein combining the plurality of transformed video streams to generate the composite video includes stitching together the plurality of transformed video streams such that a composite image is formed from the virtual camera viewpoint.

5. The method of claim 1, wherein determining whether the object at least partially obstructs the portion of the first image includes determining that a region of a first field of view of the first one of the plurality of video cameras is blocked by the object.

6. The method of claim 5, further comprising determining whether the second one of the plurality of video cameras has a second field of view that captures at least part of the region blocked by the object.

7. The method of claim 6, wherein supplementing the portion of the first image with the portion of the second image occurs when the second field of view captures the at least part of the region blocked by the object, wherein the portion of the second image includes the at least part of the region blocked by the object captured by the second field of view.

8. The method of claim 7, wherein supplementing the portion of the first image with the portion of the second image includes overlaying the portion of the second image onto the portion of the first image within the composite video.

9. A system for generating a composite video to display in a vehicle, the system comprising:

a plurality of video cameras that generate a plurality of video streams, the plurality of video cameras configured to be positioned on the vehicle;

a display; and an electronic processor communicatively coupled to the plurality of video cameras and the display, the electronic processor configured to transform the plurality of video streams to create a virtual camera viewpoint;

combine the plurality of transformed video streams to generate a composite video including a portion of a first image that is generated from a first one of the plurality of video cameras;

detect, with an electronic processor, an object external to the vehicle;

determine whether the object at least partially obscures the portion of the first image; and supplement the portion of the first image with a portion of a second image that is generated by a second one of the plurality of video cameras when the object at least partially obscures the portion of the first image, wherein the supplemented composite video includes a top-down field of view of the portion of the first image supplemented with the portion of the second image classify the object with the electronic processor;

generate a matching image based on the classification of the object;

overlay the matching image on the detected object in the composite video as an augmented object, wherein the augmented object is the visual representation of the object;

receive a feature of the object from at least one sensor;

determine whether the object is distorted in the supplemented composite video; and in response to determining that the object is distorted, adjust the matching image based on the feature before overlaying the matching image on the object in the composite video as an augmented object.

10. The system of claim 9, wherein the electronic processor is configured to transform the plurality of video streams to create the virtual camera viewpoint by transforming a plurality of wide-angle images to a plurality of rectilinear images and stitching together the plurality of transformed video streams such that a composite image is formed from the virtual camera viewpoint.

11. The system of claim 9, wherein the electronic processor is configured to determine whether the object at least partially obstructs the portion of the first image by determining that a region of a first field of view of the first one of the plurality of video cameras is blocked by the object.

12. The system of claim 11, wherein the electronic processor is further configured to determine whether the second one of the plurality of video cameras has a second field of view that captures at least part of the region blocked by the object.

13. The system of claim 12, wherein the electronic processor is configured to supplement the portion of the first image with the portion of the second image when the second field of view captures the at least part of the region blocked by the object, wherein the portion of the second image includes the at least part of the region blocked by the object captured by the second field of view.

14. The system of claim 9, wherein the electronic processor is configured to overlay the matching image on the object in the composite video by replacing pixels representing the object with a model of the object from a viewpoint that best matches the virtual camera viewpoint.

15. The method of claim 1, wherein receiving the feature of the object includes receiving a color of the object.

16. The system of claim 9, wherein the matching image is a top-down image of a virtual vehicle, the virtual vehicle matching the make and model of the object.

* * * * *